R. S. RULE.
HOG TRANSFER AND OILER.
APPLICATION FILED NOV. 2, 1915.
1,201,351.
Patented Oct. 17, 1916.
2 SHEETS—SHEET 1.
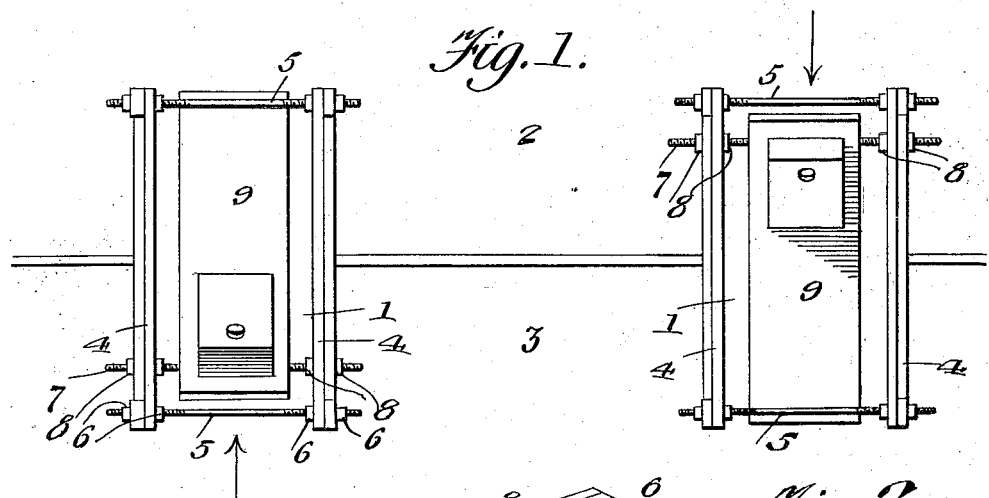
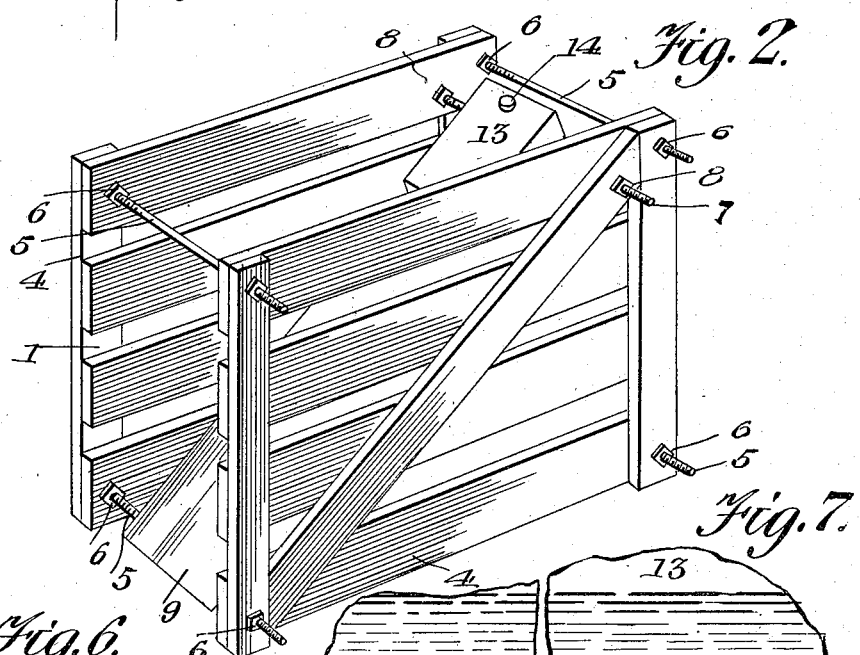
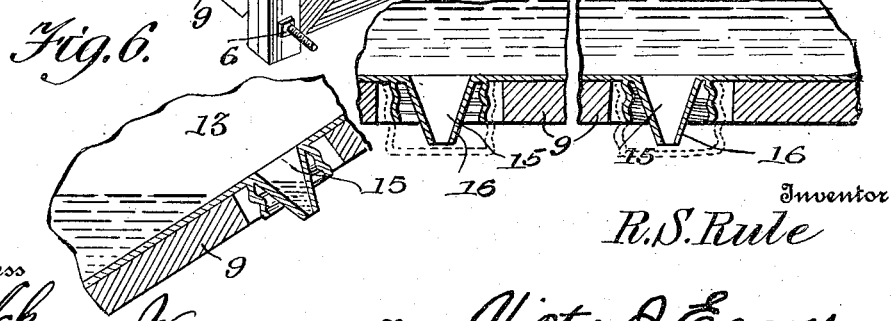
Witness
F. W. Ackman Jr.
Inventor
R. S. Rule
By Victor J. Evans
Attorney

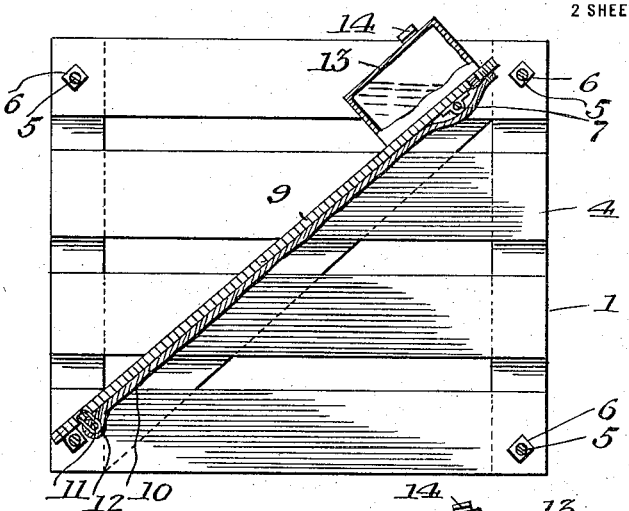
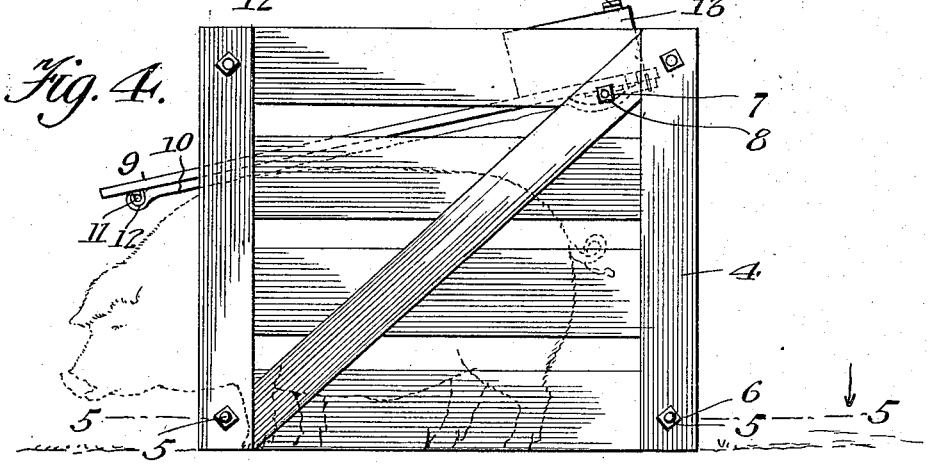
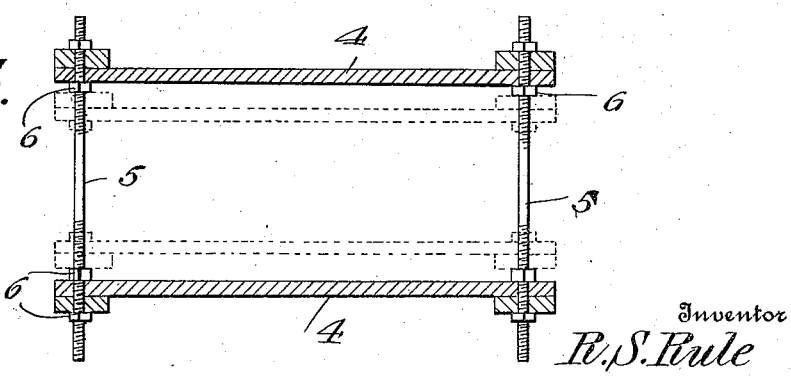

UNITED STATES PATENT OFFICE.

RICHARD S. RULE, OF PETERSBURG, ILLINOIS.

HOG TRANSFER AND OILER.

1,201,351.   Specification of Letters Patent.   Patented Oct. 17, 1916.

Application filed November 2, 1915. Serial No. 59,227.

*To all whom it may concern:*

Be it known that I, RICHARD S. RULE, a citizen of the United States, residing at Petersburg, in the county of Menard and State of Illinois, have invented new and useful Improvements in Hog Transfers and Oilers, of which the following is a specification.

The present invention relates to devices adapted to be arranged upon a fence or partition between an animal pen or other inclosure and a pasture or run to provide a passageway between the same and to further provide the said passage with a door which is normally closed but which may be opened by the contact of an animal therewith to permit of the animal passing from one of the inclosures to the other but to prevent the return of the animal through the same passageway.

Another object of the invention is to provide a device of this character having an inclined pivoted member forming a gate or door, to provide mechanism upon the said door for permitting a quantity of lubricating fluid or insect destroyer being deposited through the passageway so that the animal passing through the passageway and contacting with the door will receive a quantity of the liquid by contact with the said door.

A further object of the invention is to construct a passageway for animals, such as hogs which shall include two side members having an inclined door pivotally secured between the sides adjacent one of the corners of the said sides, means being provided between the sides and connecting the same for permitting of the lateral adjustment or regulation of the width of the passageway, the inclined member providing the door for the passageway and having arranged thereon a fluid or lubricant receptacle provided with one or more outlets so arranged upon the base of the receptacle to be disposed away from the fluid when the door is in its tilted position and the fluid is maintained in a horizontal position, by which a quantity will be ejected through the openings when the door is raised, the inner face of the door having a coating of absorbent material which receives the lubricant ejected or deposited from the receptacle when the animal is passed through the passageway and the door is returned to its initial inclined position.

With the above and other objects in view, the improvement resides in the construction, combination and arrangement of parts set forth in the following specification and falling within the scope of the appended claims.

In the drawings, Figure is a top plan view illustrating the arrangement of passageways constructed in accordance with my invention between a pen or other animal inclosure and a pasture or run for the animals, Fig. 2 is a perspective view of one of the passageways, Fig. 3 is a central longitudinal sectional view through the same, Fig. 4 is a similar view showing the door elevated, as when an animal is passing through the passageway, Fig. 5 is a horizontal sectional view illustrating the manner in which the side members of the passageway may be adjusted, and Figs. 6 and 7 are details.

The device is primarily adapted for applying insecticides and disinfectants to the bodies of hogs but may, of course, be applicable to other animals, and in reducing my improvement to practice I provide passageways 1—1 between, say, a pen or other inclosure 2 and a run or pasture 3.

While all the passageways 1 are of a similar construction, the doors for the same hereinafter more fully described are arranged to open in different directions; that is, certain of the passageways have their doors opening to the pen while others have their doors opening to the run or pasture, so that the animals must use different passageways when leaving or returning to the pen.

Each of the passageways includes two spaced sides 4—4, each of the sides being preferably constructed by end uprights having spaced boards secured thereto and angularly disposed braces between the uprights. Passing through the sides at the corners thereof are transversely arranged threaded bars 5—5, nuts 6—6 being arranged upon the said rods and disposed to the opposite faces of the sides 4, so by regulating the nuts it will be noted that the sides may be adjusted toward or away from each other and so regulate the width of the passageways to permit of animals of different sizes freely passing therethrough. In addition to the rods aforementioned another rod 7 is employed which is disposed adjacent one of the upper rods at one of the corners of the passageway, and this rod has its opposite end threaded and provided with nuts 8 to permit of the adjustment of the sides as just set forth. The rod 7 provides a pivot or hinged connection for a door 9. This door is of a size sufficient to have its free end rest upon the lower corner rod 5 diametrically opposite the pivot rod 7 or the corner rod 5 adjacent the said pivot rod 6. The underface of the door is provided with a coating of some suitable absorbent material, such as felt, and indicated by the numeral 10, and this felt is secured to the edges of the board in any desired or preferred manner as for instance by providing the edges of the felt with a reinforcing wire 11 and passing staples 12 between the said wire and the edges of the door.

The felt facing at what I will term the upper end of the door, or the portion of the door pivoted to the rod 7 may be disconnected and spaced a suitable distance from the door, to provide what may be termed a pocket, whereby a lubricant may be directed between the facing 10 and the inner face of the door and directed toward the bottom of the door. Also the facing at the bottom of the door may be thickened or otherwise reinforced so that the lubricant will not flow therethrough.

Arranged upon the outer face of the door, at the top thereof is a substantially rectangular receptacle 13, the same having its outer face provided with an oil entrance which is normally closed through the medium of a cap 14. The receptacle, at the end thereof which is disposed at the upper edge of the door and at the corner thereof from which the felt facing 10 is slightly spaced is formed with a plurality of openings 15. A sufficient amount of fluid is deposited within the receptacle so that the level of the same will be out of the path of the openings 15 when the receptacle is retained at an angle when the door is normally closed. When the animal passes between the sides of the passageway and contacts with the lower end of the receptacle to find an exit, he will necessarily elevate the door thus tilting the receptacle so that the fluid within the receptacle will be brought over the openings 15 and a small amount of said fluid will be permitted to flow from the receptacle between the facing 10 and the inner face of the door 9. This fluid flows to the lower edge of the facing 10, but is sufficient to saturate the facing to contact with both the neck and back of the animal, when the said animal passes through the passageway. Each of the openings 15 is surrounded by a small funnel-shaped spout 16. These spouts can, of course, contain only a small quantity of the lubricant and the restricted mouths of said spouts prevent the said lubricant flowing rapidly through the spouts and as a consequence the said lubricant is fed slowly to the facing. It is, of course, to be understood that the level of the lubricant is below the openings 15 when the door is closed. The openings 15 as well as the spouts 16 may be closed by a suitable cap, indicated by the dotted lines in Fig. 7, when it is desired that the device be employed only as a passageway and not as an oiler for the animals contacting with the gate of the passageway or also when it is desired to fill the receptacle 13 with the liquid.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. In a device for the purpose set forth, an inclined door, a liquid receptacle, means for depositing a predetermined quantity of the liquid upon the door upon opening of said door.

2. In a device for the purpose set forth, a passageway including sides, means for adjusting the sides toward or away from each other, an inclined door pivoted at its upper end between the sides, an oil receptacle secured to the door at the upper end thereof, said receptacle having openings, a fluid within the receptacle and the level of the said fluid being below the openings when the door is in its inclined and closed position.

3. In a device for the purpose set forth, a passageway including sides, spacing means for the sides, adjusting means for the spacing means, a door having one of its ends pivotally secured to one of said spacing means and arranged angularly between the sides and resting upon another of the spacing means, an oil receptacle, and means for ejecting oil from the receptacle and depositing the same upon the door when the door is swung to an open position.

4. A passageway including sides, spacing members for the sides, an inclined door pivotally secured to one of the spacing members, an oil receptacle, and means actuated by the opening of the door for depositing a quantity of oil from the receptacle upon the inner face of the door.

5. In a device for the purpose set forth, a passageway including sides, spacing members for the sides, adjusting means for the spacing means, a door between the sides and pivoted adjacent one of the corners thereof, and inclined toward the diametrically opposite lower corner thereof, a fabric facing upon the inner side of the door and secured to the edges of the door, a lubricant receptacle having a lubricant therein, and means actuated by the tilting of the door to an open position for depositing a quantity of the lubricant from the receptacle between the inner face of the door and the facing therefor.

6. In a device for the purpose set forth, a passageway including sides, spacing members for the sides, means for adjusting the spacing members, a door hinged between the sides at one of the upper corners thereof and arranged angularly between the sides, a felt facing for the inner side of the door secured to the lower and side edges of the door, a liquid receptacle arranged upon the outer face of the door at the upper portion thereof, said receptacle having openings surrounded by spouts which pass through openings in the door and having their mouths arranged between the inner face of the door and the facing upon the said inner face of the door, as and for the purpose set forth.

In testimony whereof I affix my signature in presence of two witnesses.

RICHARD S. RULE.

Witnesses:
GEORGE U. MILES,
JOHN HUDSPETH.

Copies of this patent may be obtained for five cents each, by addressing the "Commissioner of Patents, Washington, D. C."